United States Patent [19]
Traylor et al.

[11] Patent Number: 5,961,040
[45] Date of Patent: Oct. 5, 1999

[54] MATERIAL APPLICATION SYSTEM WITH PROGRAMMING SECURITY

[75] Inventors: Duston D. Traylor, Girard; Patrick Fuchs, Chatham, both of Ill.

[73] Assignee: Dickey-John Corporation, Auburn, Ill.

[21] Appl. No.: 09/039,015

[22] Filed: Mar. 13, 1998

[51] Int. Cl.[6] .......................... B05B 17/00; B05B 17/04; A01C 19/00; A01C 27/00
[52] U.S. Cl. .................................. 239/1; 239/7; 239/69; 239/74; 239/677
[58] Field of Search ............................... 239/7, 1, 67–69, 239/73, 74, 662, 679, 681, 677; 172/2; 701/50

[56] References Cited

U.S. PATENT DOCUMENTS

| | | | |
|---|---|---|---|
| Re. 35,100 | 11/1995 | Monson et al. | 239/1 |
| 4,107,784 | 8/1978 | Van Bemmelen | 364/900 |
| 4,373,668 | 2/1983 | Forbes et al. | 239/74 |
| 4,803,626 | 2/1989 | Bachman et al. | 239/172 |
| 4,898,333 | 2/1990 | Kime et al. | 239/657 |
| 5,186,396 | 2/1993 | Wise et al. | 239/675 |
| 5,318,226 | 6/1994 | Kime et al. | 239/1 |
| 5,699,261 | 12/1997 | Muona | 364/474.02 |
| 5,712,782 | 1/1998 | Weigelt et al. | 364/424.7 |
| 5,786,983 | 7/1998 | Brenner et al. | 361/680 |
| 5,870,686 | 2/1999 | Monson | 239/1 |
| 5,889,671 | 3/1999 | Autermann et al. | 701/50 |

OTHER PUBLICATIONS

DjICS2000 Ice Control System Operator's Manual, Dickey–john Corporation, 11 pages, undated, prior art.

Dickey–john "ICS2000" Control System Features, 1 page, undated, prior art.

"Control of the Future" ICS 2000 Dickey–john Corporation Manual, 4 pages, undated, prior art.

DjICS2000 Ice Control System Calibration and Programming Manual, Dickey–john Corporation, 45 pages, undated, prior art.

*Primary Examiner*—Andres Kashnikow
*Assistant Examiner*—Jorge Bocanegra
*Attorney, Agent, or Firm*—Marshall, O'Toole, Gerstein, Murray & Borun

[57] ABSTRACT

A material application system and a method of using a material application system which incorporate both an input mechanism for use by a programmer to program the material application system and a separate input mechanism, in the form of a switch module, for use by a driver of the vehicle in which the material application system is incorporated during material application. The method includes the steps of: (a) operatively coupling an input mechanism to a programmable controller; (b) while the input mechanism is operatively coupled to the programmable controller, using the input mechanism to program the programmable controller; (c) then operatively uncoupling the input mechanism from the programmable controller; (d) while the input mechanism is operatively uncoupled from the programmable controller, using the material application system to apply the material; and (e) while the input mechanism is operatively uncoupled from the programmable controller, while the switch module is operatively coupled to the programmable controller, and while the material application system is being used to apply the material, using the switch module to modify a material application rate.

18 Claims, 6 Drawing Sheets

MATERIAL APPLICATION SYSTEM WITH PROGRAMMING SECURITY

BACKGROUND OF THE INVENTION

The invention is directed to a material application system for applying a material, such as salt, from a vehicle that is being driven to prevent the accumulation of snow on a road, for example.

A material application system of the above type is described in U.S. Pat. No. 4,373,668 to Forbes, et al. That system has a control panel 14 which, as shown in FIG. 3 of the patent, allows the operator of the vehicle to control certain functions. To that end, the control panel 14 includes an on/off switch 100, a spinner switch 62A that is used to adjust the speed of a spinner motor 26 that controls the spreading of granular material, a blast switch 110 to provide a relatively large application of granular material for a relatively short period of time, a switch 94 for increasing or decreasing the application rate of the granular material, and a mode switch 104. Other material application systems are described in U.S. Pat. Nos. 4,898,333 and 5,318,226 to Kime, et al.

Other prior art material application systems have been marketed by the Dickey-john Corporation, the assignee of this patent. One such system was provided with a single control module having a relatively small number, e.g. five, of multi-function keys. The control module was designed to be used by both a supervisor or programmer while the vehicle was not in operation and the driver of the vehicle when the material was being applied. Use of the control module by the programmer was intended to allow the programmer to program the material application system by entering a number of programming parameters to control various functions, such as granular application rates and/or liquid application rates.

Use of the control module by the driver during material application was intended to be more limited. The driver was only allowed to enter or modify certain operational parameters, such as an increase or decrease in material application rate, but not other operational parameters, referred to as "restricted" parameters. The material application system was provided with a password feature that allowed one with a password to enter or modify the restricted parameters. The entry of restricted parameters was controlled by providing programmers with passwords, but not providing drivers with passwords.

SUMMARY OF THE INVENTION

The invention is directed to a material application system, and a method of using a material application system, which incorporate both an input mechanism for use by a programmer to program the material application system and a separate input mechanism, in the form of a switch module, for use by a driver of the vehicle in which the material application system is incorporated during material application.

More specifically, the invention is directed to a method of using a material application system adapted to be incorporated in a vehicle for applying material as the vehicle is being driven. The material application system has a programmable controller, an input mechanism associated with the programmable controller, and a switch module associated with the programmable controller. The method includes the steps of: (a) operatively coupling the input mechanism to the programmable controller; (b) while the input mechanism is operatively coupled to the programmable controller, using the input mechanism to program the programmable controller; (c) then operatively uncoupling the input mechanism from the programmable controller; (d) while the input mechanism is operatively uncoupled from the programmable controller, using the material application system to apply the material; (e) while the input mechanism is operatively uncoupled from the programmable controller, while the switch module is operatively coupled to the programmable controller, and while the material application system is being used to apply the material, using the switch module to modify a material application rate.

The invention is also directed to a material application system adapted to be incorporated in a vehicle for applying material as the vehicle is being driven. The material application system is provided with a programmable controller, an input mechanism operatively attachable to and removable from the programmable controller for inputting a plurality of material application parameters into the programmable controller, a material applicator for applying material at a material application rate as the vehicle is being driven, an actuator mechanism coupled to the material applicator and the programmable controller for controlling the material applicator, and a switch module operatively attachable to the programmable controller, the switch module having a switch for allowing an operator to change the material application rate.

The features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
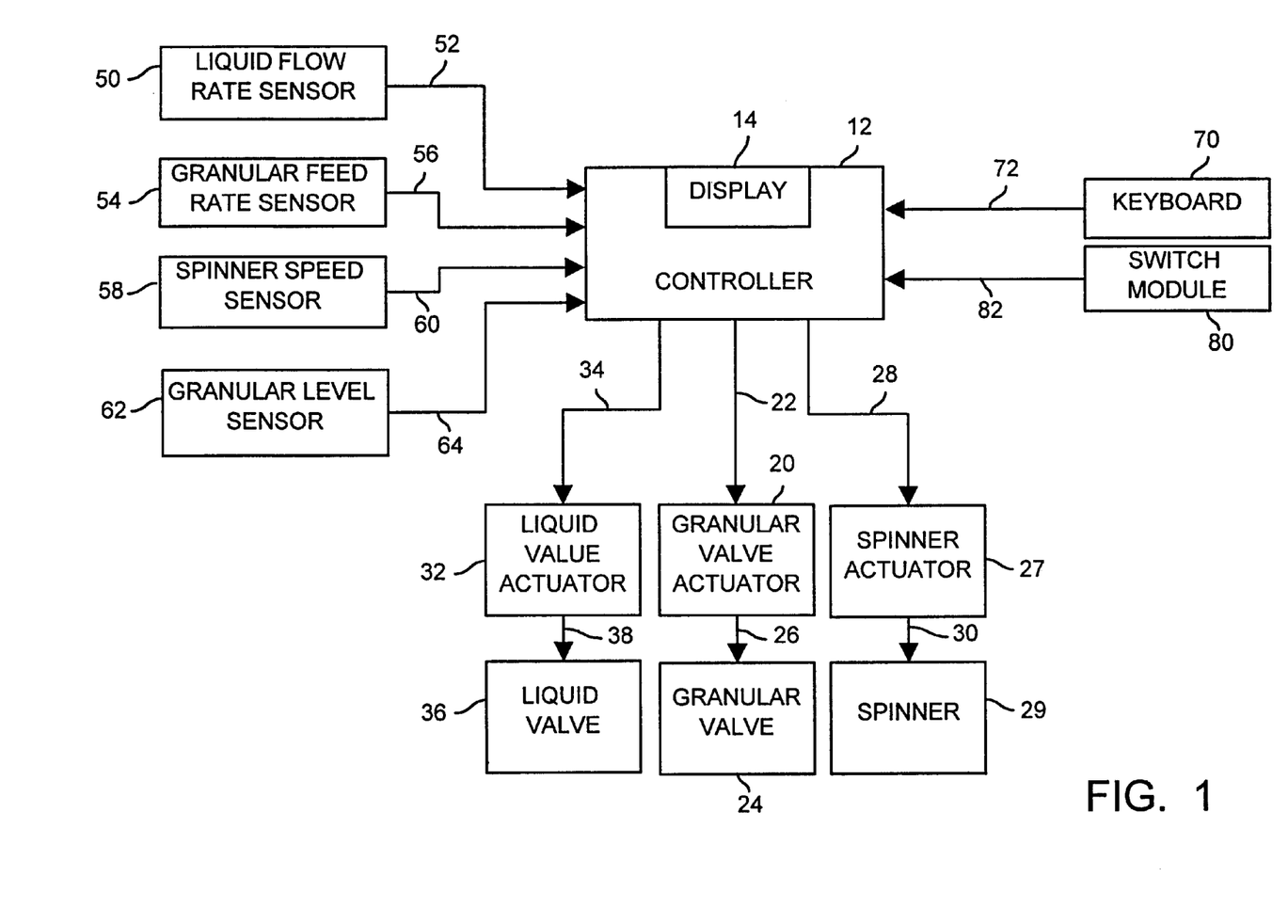
FIG. 1 is a block diagram of a preferred embodiment of a material application system in accordance with the invention.

FIG. 1 illustrates a block diagram of a preferred embodiment of a material application system 10 that is adapted to be mounted to a vehicle, such as a truck, and which is used to apply a material, such as salt or sand for example, to a road during winter as the vehicle is being driven along the road to reduce or minimize hazardous driving conditions. The system could also be used for other purposes, such as for spraying agricultural materials (e.g. fertilizer) while the vehicle is being driven in a field, or for spraying weed killer onto weeds along the side of a road on which the vehicle is being driven.

Referring to FIG. 1, the system 10 has a programmable controller 12 with an integral display 14 for generating various visual displays during use of the system 10. The controller 12, which would typically be mounted or positioned within the cab of the truck within ready access to the driver, is connected to a granular valve actuator 20 via a control line 22, and the granular valve actuator 20 is connected to a granular valve 24 via a connection 26, which may be an electrical line in the case of PWM actuator and valve or a mechanical connection in the case of a mechanically corrected servo valve. The controller 12 is connected to a granular actuator, such as a spinner actuator 27, via a control line 28, and the spinner actuator 27 is connected to a granular application device, such as a spinner 29, via a line 30. The spinner 29 may be mounted on the rear end of a dump truck, for example.

During operation of the system 10, granular material is fed to the spinner 29 at a rate controlled by the granular valve 24. The granular material may be spread onto a road by the spinner 29, with the rotational speed of the spinner 29 determining the width of application of the granular material. Relatively high rotational speeds of the spinner 29 correspond to larger application widths.

The controller 12 is coupled to a liquid valve actuator 32 via a control line 34. The liquid valve actuator is operatively connected to a liquid valve 36 via a connection 38. When the system 10 is used in winter, the liquid valve 36 may be used to apply pre-wetting liquid to the granular material before it is applied to a road by the spinner 29. When the system 10 is used in spring or summer, the liquid valve may be used to apply liquid weed killer, fertilizer, or other such materials to crops or fields. In that case, one or more booms which extend laterally of the truck may be used to apply the liquid.

The system 10 has various feedback sensors. These include a liquid flow rate sensor 50 connected to the controller 12 via a line 52, a granular feed rate sensor 54 connected to the controller 12 via a line 56, and a spinner speed sensor 58 connected to the controller 12 via a line 60. The liquid flow rate sensor 50 is used to sense the flow rate of the liquid that passes through a liquid conduit (not shown) associated with the liquid valve 36.

During operation, the controller 12 adjusts the position of the liquid valve actuator 32, based on the magnitude of the feedback signal generated by the liquid flow rate sensor 50, to control the rate at which the liquid is applied to a desired value. Similarly, the controller 12 adjusts the position of the granular valve actuator 20, based on the magnitude of the feedback signal generated by the granular feed rate sensor 54, to control the rate at which granular material is provided to the spinner 29 to a desired value. The rotational rate of the spinner 29 may be controlled to a desired value based on a feedback signal generated by the spinner speed sensor 58. The system 10 may include a granular level sensor 62 connected to the controller 12 via a line 64 so that an alarm or other indication may be generated for the driver when the truck is empty of granular material.

An input mechanism, such as a keypad or keyboard 70, is operatively attachable to and removable from the controller 12. When the keyboard 70 is operatively coupled to the controller 12, programming parameters may be input to the controller 12 via the keyboard 70. The keyboard 70 may be attached to the controller 12 via a physical link, such as a cord, or via a non-physical link, such as an infrared link. If a non-physical link is used, the keyboard 70 is considered operatively attached or coupled to the controller 12 when the keyboard 70 is within communication range of the controller 12 and operatively removed or uncoupled from the controller 12 when the keyboard 70 is not within communication range of the controller 12, such as by being removed from the cab of the truck in which the controller 12 is located.

Figure 3:
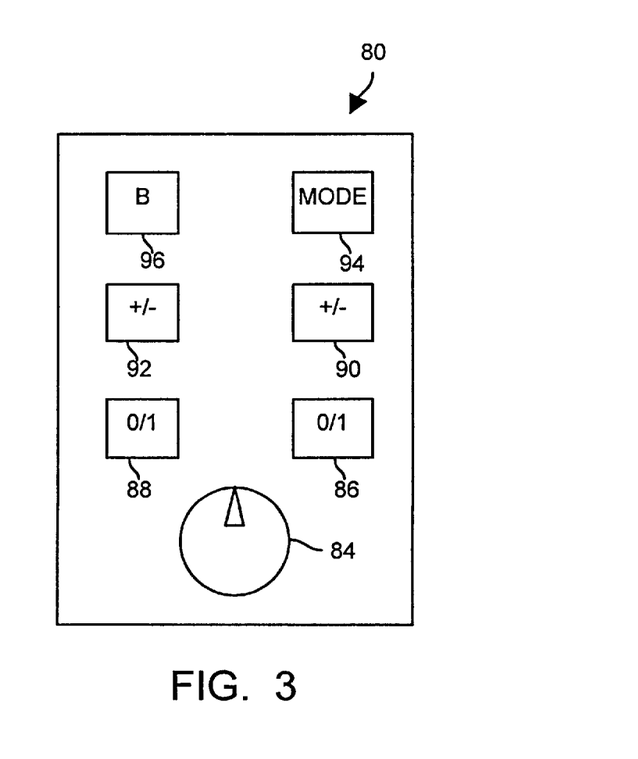
FIG. 3 is an illustration of the switch module shown schematically in FIG. 1.

FIG. 3 illustrates the switch module 80 shown schematically in FIG. 1. Referring to FIG. 3, the switch module 80 has a rotary switch 84 that may be used by the operator to adjust the rotational speed of the spinner 29, and thus the width at which granular material is being applied. The switch module 80 has an on/off switch 86 that may be used by the operator to control whether granular material is being applied (when the switch 86 is in the off position, no granular material is applied) and an on/off switch 88 that may be used by the operator to control whether liquid is being applied.

The switch module 80 has a rate adjustment switch 90 that may be used by the operator to adjust the rate at which granular material is applied to the road (changing the switch 90 causes the controller 12 to change the position of the granular valve 24 via the valve actuator 20) and a rate adjustment switch 92 that may be used to incrementally adjust the rate at which liquid is applied (changing the switch 92 causes the controller 12 to change the position of the liquid valve 36 via the valve actuator 32). The switch module 80 also has a three-position mode switch 94 (described in more detail below) and a blast button 96 which, when pressed, greatly increases the application rate of the material.

Figure 2:
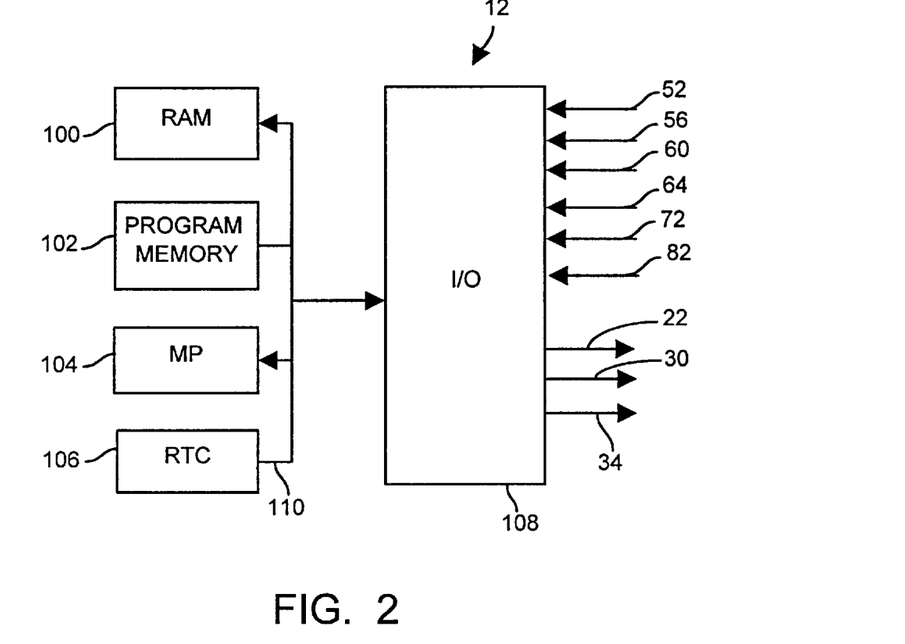
FIG. 2 is a block diagram of the controller shown schematically in FIG. 1.

A block diagram of the internal electronic components of the controller 12 is shown in FIG. 2. Referring to FIG. 2, the controller 12 includes a random-access memory (RAM) 100, a program memory 102, such as a read-only memory (ROM), a microprocessor (MP) 104, a real-time clock (RTC) 106, and an input/output (I/O) circuit 108, all of which are interconnected via an address/data bus 110. The particular architecture of the controller 12 is not considered important to the invention, and numerous other designs could be used.

OPERATION

Figure 4:
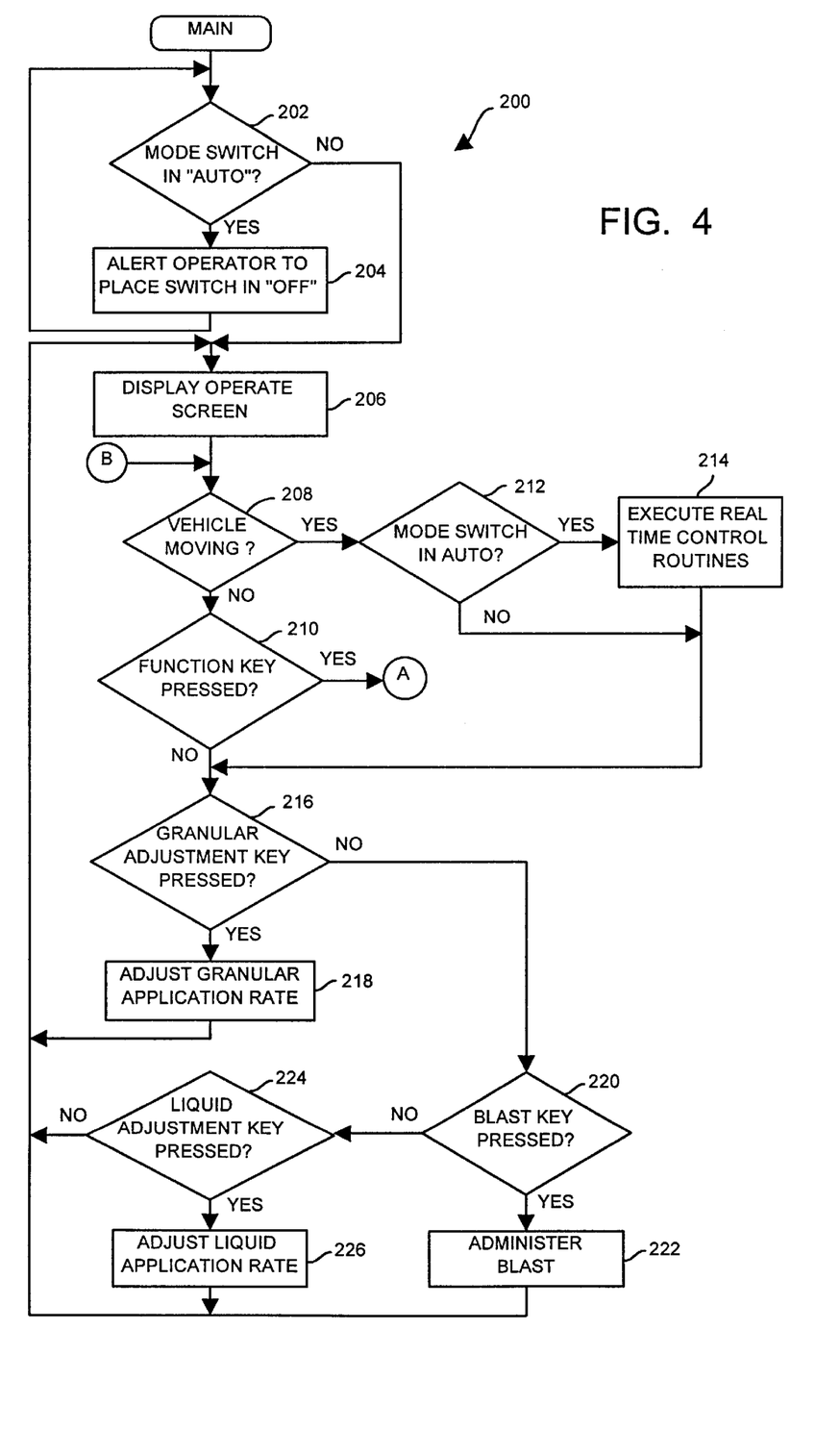
FIGS. 4 and 5 illustrate a flowchart of a main routine that is performed by the controller shown schematically in FIG. 1.
Figure 5:
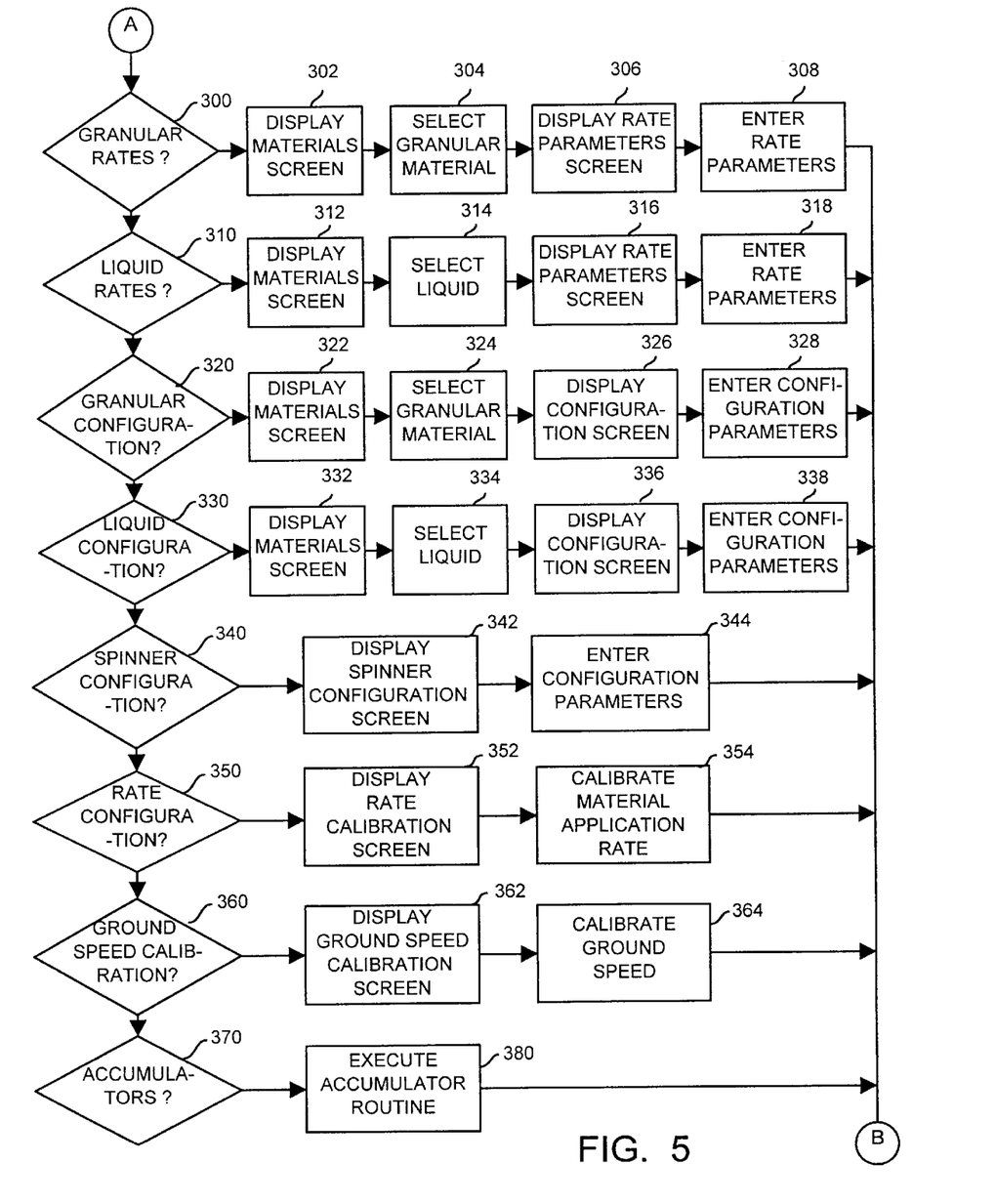
Figure 6:
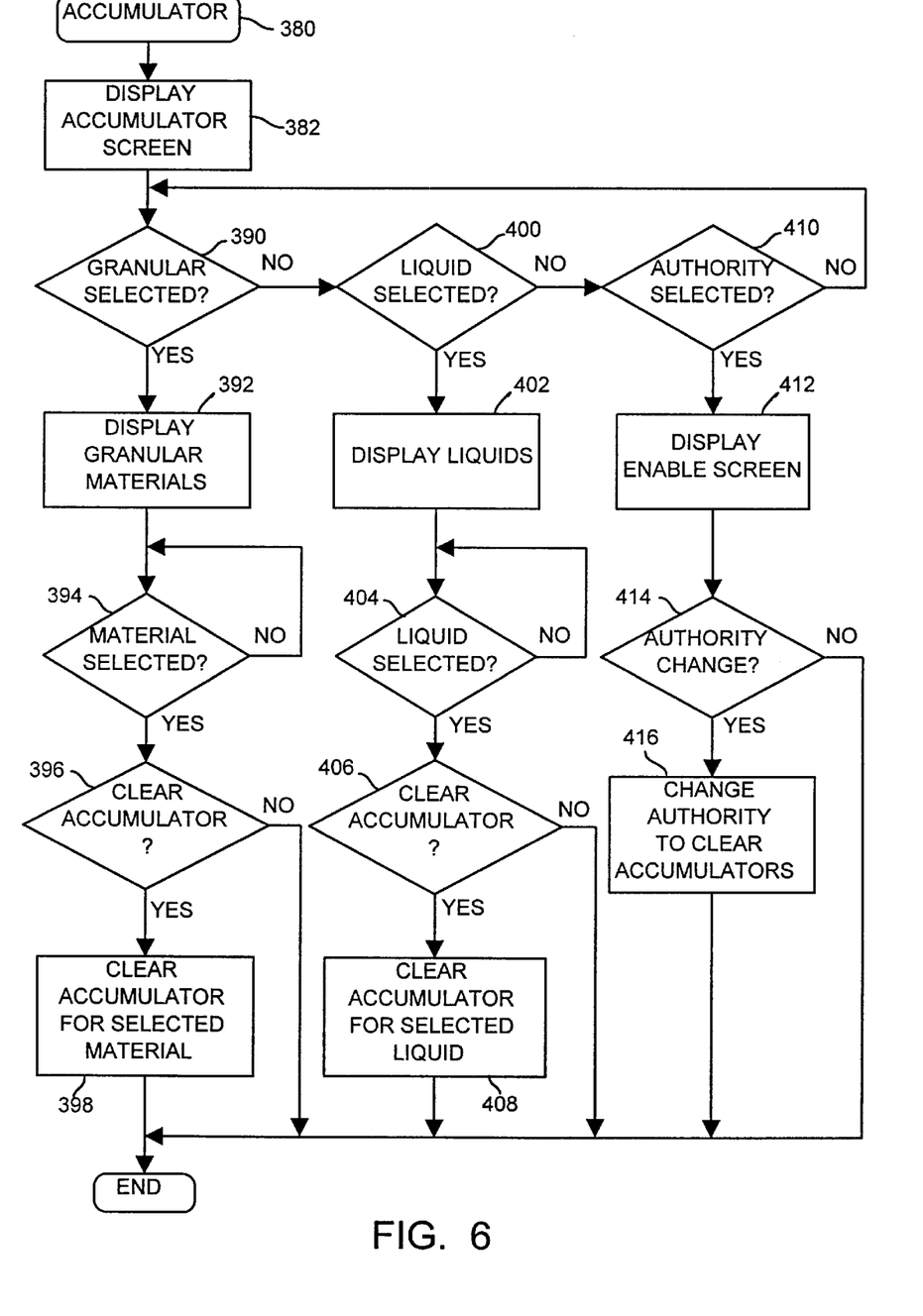
FIG. 6 is a flowchart of an accumulator routine shown schematically in FIG. 5.

The operation of the system 10 is controlled by a computer program stored in the program memory 102 and executed by the microprocessor 104. Flowcharts of pertinent portions of the computer program are shown in FIGS. 4–6. A flowchart of a main program routine 200 is shown in FIG. 4. The main routine 200 is designed to begin operation when the power is turned on. Referring to FIG. 4, the main routine 200 begins operation at step 202, which determines whether the mode switch 94 is in its automatic position. If the mode switch 94 is in the automatic position, the program branches to step 204, where the operator is prompted to move the mode switch 94 to the off position.

Figure 7A:
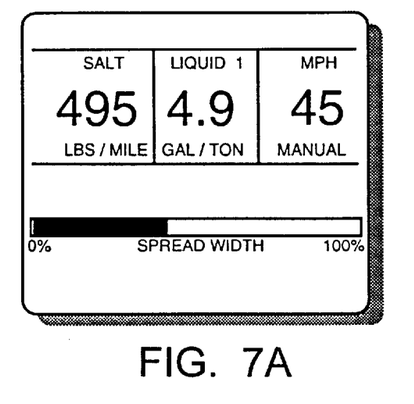
FIGS. 7A–7F illustrate various screen displays that are generated on the display of the controller of FIG. 1 during operation of the system.

At step 206, an operate screen is displayed on the display 14 (FIG. 1). One example of an operate screen (corresponding to a screen displayed when the vehicle is moving) is shown in FIG. 7A. That screen includes a granular application rate (495 pounds of salt per mile driven), a liquid application rate (4.9 gallons of liquid per ton of salt), the speed of the vehicle (45 mph), and the spread width of the granular material (between 0 and 100% of maximum spread width).

Before the system 10 is used, it is first programmed, preferably while the vehicle is stationary, with the keyboard 70 being operatively coupled to the controller 12 (the programming is described in more detail below). After the controller 12 is programmed, the keyboard 70 is operatively detached from the controller 12, and the vehicle is then driven by the driver to apply the material. Since the keyboard 70 is no longer operatively coupled to the controller 12, the only further control actions that may be taken by the driver are those that are allowed by the switch module 80. The initial programming does not have to be performed every time the vehicle is used to apply the material. The initial programming of the controller 12 could be performed at the start of each winter or summer season, or more or less frequently. Since the keyboard 70 may be used much less frequently than the switch module 80, a single keyboard 70 could be used to program multiple controllers 12.

Initial programming of the controller 12 is performed with the function keys (e.g. F1 through F12) of the keyboard 70. Referring to FIG. 4, if the vehicle is not moving as determined at step 208, then the program branches to step 210, which determines whether any of the function keys of the keyboard 70 has been pressed to initiate a programming step. If so, the program branches to step 300 (FIG. 5), where programming may be performed.

Application of Materials—Vehicle Moving

If the vehicle was moving as determined at step 208, the program branches to step 212, which determines whether the mode switch 94 is in its automatic position. If so, the program branches to step 214, where a number of conventional real-time control routines are performed to control, for example, the application of the granular and liquid materials in accordance with desired application rates using conventional feedback techniques.

Step 216 determines whether the granular application rate adjustment switch 90 (FIG. 3) was pressed. If so, the program branches to step 218 where the granular application rate is adjusted in response to the pressing of the switch 90. Step 220 determines whether the blast key 96 was pressed. If so, the program branches to step 222 where a blast is administered by greatly increasing the granular and/or liquid application rates. Step 224 determines whether the liquid application rate adjustment switch 92 was pressed. If so, the program branches to step 226 where the liquid application rate is adjusted in response to the pressing of the switch 92.

Initial Programming—Vehicle Stopped

The portion of the main routine 200 that relates to programming of the controller 12 is shown in FIG. 5. Referring to FIG. 5, eight programming options are shown, corresponding to steps 300, 310, 320, 330, 340, 350, 360, and 370. For each programming option selected by the programmer, a number of steps are performed.

Figure 7B:
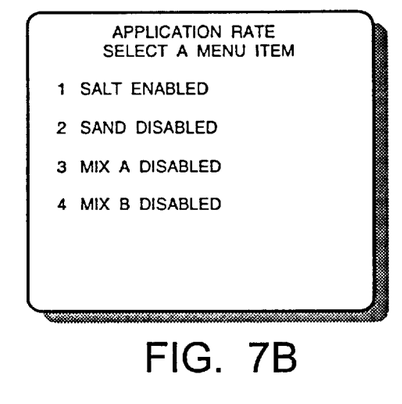

At step 300, if the programmer elected to program a granular application rate (for example, by pressing a particular function key on the keyboard 70), the program branches to step 302 where a materials screen is displayed on the display 14 (FIG. 1). One example of such a materials screen, which is shown in FIG. 7B, displays four choices of materials (salt, sand, mix A, mix B) that can be selected by the programmer.

Figure 7C:
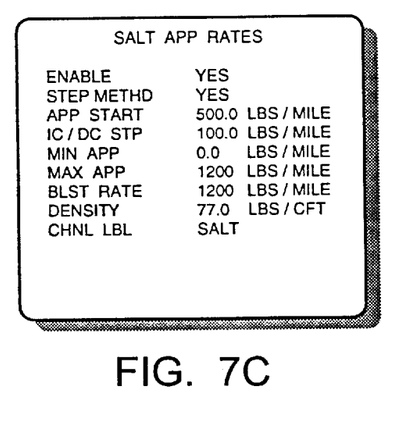

After the programmer selects one of the materials at step 304, the program branches to step 306 where a rate parameters screen is displayed on the display 14. One example of such a screen, which is shown in FIG. 7C, allows the programmer to use a "step method" to program a plurality of granular application rates. At step 308, in accordance with the step method, the programmer specifies a starting application rate (i.e. 500 pounds/mile as shown in FIG. 7C) and the magnitude of the increments and decrements of the starting application rate (shown to be 100 pounds/mile after "IC/DC STP"). After the granular application rate is programmed in this way and the system 10 is used by the driver, each push of the granular application rate key 90 by the driver will cause the granular application rate to change by 100 pounds/mile.

Figure 7D:
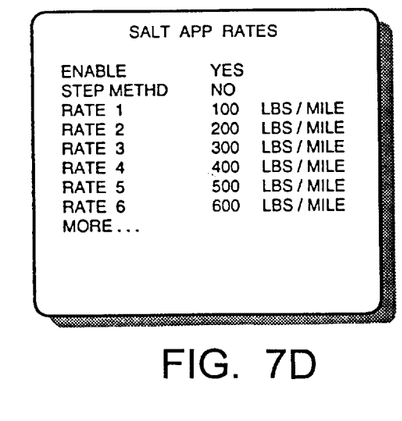

An alternative way of programming the granular application rate at step 308, which is referred to as a "rate method," may be used in connection with a rate parameters display screen shown in FIG. 7D. In accordance with the rate method, the programmer simply specifies a plurality of individual application rates, each of which may differ from the other rates by varying amounts (although the rates shown in FIG. 7D all differ by the same amount).

At step 310, if the programmer elected to program the liquid application rate (e.g. by pressing a different one of the function keys on the keyboard 70), steps 312 through 318 are performed to program the liquid application rates. Steps 312–318 are analogous to steps 302–308, respectively, described above in connection with the programming of the granular application rates.

Figure 7E:
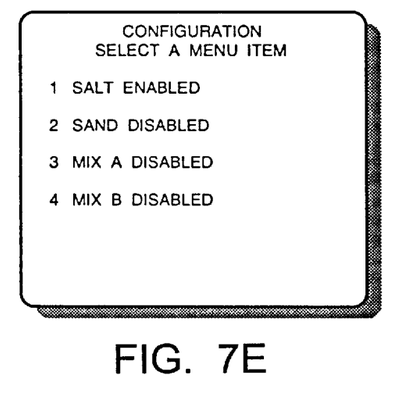
Figure 7F:
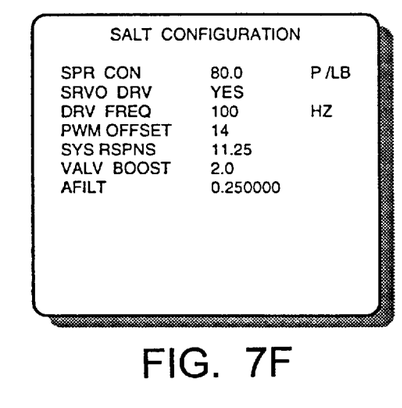

At step 320, if the programmer elected to program the granular configuration, the program branches to step 322 where a granular materials screen is displayed on the display 14. One example of such a granular materials screen (which is similar to the screen shown in FIG. 7B described above) is shown in FIG. 7E. After the programmer selects one of the displayed granular materials at step 324, the program branches to step 326 where a configuration screen is shown on the display 14, one example of which is shown in FIG. 7F, and then to step 328 where the programmer may enter various configuration parameters. Referring to FIG. 7F, those configuration parameters may include a spreader constant ("SPR CON"), which may be, for example, the number of electronic pulses generated by the granular feed rate sensor 54 (FIG. 1) per pound of granular material applied by the spinner 29 (FIG. 1); a drive frequency ("DRV FREQ") suggested by the manufacturer of the granular valve actuator 20 (FIG. 1); and a PWM offset value which defines the starting point of the operating range of the granular valve 24 (FIG. 1).

The particular granular configuration parameters which may be entered by the programmer depend on the particular design of the system 10, and configuration parameters different than those shown in FIG. 7F could be used. The selection and use of such configuration parameters is conventional.

At step 330, if the programmer elected to program the liquid configuration, steps 332 through 338 are performed to enter the liquid configuration parameters. Steps 332–338 are analogous to steps 322–328, respectively, described above in connection with the programming of the granular configuration parameters. At step 340, if the programmer elected to program the spinner configuration (to enter configuration parameters relating to the operation of the spinner 29 shown in FIG. 1), the program branches to step 342 where a spinner configuration screen is shown on the display 14 and then to step 344 where the programmer may enter various spinner configuration parameters.

The application rates of the material may be calibrated by the programmer to generate a calibration constant for each material. At step 350, if the programmer elected to calibrate the application rate of a material, the program branches to step 352 where a rate calibration screen is shown on the display 14. This screen displays a number of materials which may be calibrated. After the programmer selects one of the materials for which a calibration constant is to be determined, the program branches to step 354 where the selected material application rate is calibrated by the determination of a calibration constant.

The calibration constant may be determined in a conventional manner. For example, the calibration constant may be determined by applying the selected material at a predetermined application rate, e.g. 500 pounds per mile, while the vehicle is stationary (e.g. the engine being run with the clutch disengaged) for a time duration corresponding to a predetermined "distance" (that the vehicle would travel if the clutch were engaged, for example). After the material is dispensed for the predetermined "distance," the dispensed material is weighed (e.g. by weighing the vehicle both before and after the material is dispensed) to determine the amount of dispensed material.

The calibration constant determined at step 354 is based on the expected amount of applied material and the actual amount of applied material. For example, if the predetermined application rate was 500 pounds/mile and the vehicle was "driven" one mile during the calibration procedure, the expected amount of material would be 500 pounds. If only 450 pounds were actually dispensed during the calibration procedure, the calibration constant would be based on the ratio of 450 and 500 (in this case the rate at which the material would be subsequently applied would be increased, e.g. by a factor of 500/450, or 1.11).

The programmer may elect to calibrate a ground speed sensor (not shown) utilized in the system 10. At step 360, if the programmer elected to calibrate the ground speed, the program branches to step 362 where a ground speed calibration screen is displayed and then to step 364 where the ground speed sensor is calibrated. That may be accomplished, for example, by determining the number of electrical pulses that the ground speed sensor generates when the vehicle is driven exactly one mile. That number of pulses is then assumed by the system 10 to correspond to one mile of vehicle travel, and subsequent distance and ground speed measurements are based thereon.

The programmer may also elect to perform an accumulator routine for controlling various electronic accumulators that keep track of the accumulated amount of granular and liquid materials that have been applied and/or the time duration that material has been applied. Such accumulators could keep track of both season totals and totals for a single run. If the programmer has selected this option at step 370, the program branches to step 380 where an accumulator routine 380 is performed.

FIG. 6 illustrates a flowchart of the accumulator routine 380 shown schematically in FIG. 5. Referring to FIG. 6, at step 382 an accumulator screen is shown on the display 14. This screen (not shown) allows the programmer to select one of three options: granular, liquid or authority. If the programmer selected the granular option as determined at step 390, the program branches to step 392 where a plurality of granular materials are displayed. After the programmer has selected one of the displayed granular materials as determined at step 394, the program branches to step 396, where the program determines if the programmer requested that the accumulator for the selected granular material be cleared. If so, the program branches to step 398 where the electronic accumular for the selected material is cleared, or reset to zero. If the programmer selected the liquid option as determined at step 400, the program performs steps 402–408, which are analogous to steps 392–398, respectively, described above.

If the programmer selected the authority option as determined at step 410, the program branches to step 412 where an enable screen is displayed on the display 14. The authority option allows the programmer to selectively enable the driver of the vehicle to clear certain accumulators (e.g. those for the current run, but not those keeping track of season totals). If the programmer enters any authority change commands (e.g. changes "enable" to "disable") for any accumulators as determined at step 414, the program branches to step 416 where the authority to clear such accumulator(s) is changed.

Although a specific set of programming options has been described above in connection with FIGS. 5 and 6, the particular programming options utilized are not considered important to the invention. Numerous other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of using a material application system adapted to be incorporated in a vehicle for applying material to a road, said material application system having a programmable controller, an input mechanism associated with said programmable controller, and a switch module associated with said programmable controller, said method comprising the steps of:

(a) operatively coupling said input mechanism to said programmable controller;

(b) while said input mechanism is operatively coupled to said programmable controller, using said input mechanism to input a parameter relating to a granular application rate into said programmable controller;

(c) while said input mechanism is operatively coupled to said programmable controller, using said input mechanism to input a parameter relating to a liquid application rate into said programmable controller;

(d) after said steps (b) and (c), operatively uncoupling said input mechanism from said programmable controller;

(e) while said input mechanism is operatively uncoupled from said programmable controller, using said material application system to apply granular material to a road;

(f) while said input mechanism is operatively uncoupled from said programmable controller, while said switch module is operatively coupled to said programmable controller, and while said material application system is being used to apply granular material to a road, using said switch module to modify said granular application rate; and (g) while said input mechanism is operatively uncoupled from said programmable controller, while said switch module is operatively coupled to said programmable controller, and while said material application system is being used to apply granular material to a road, using said switch module to modify said liquid application rate.

2. A method as defined in claim 1 wherein said step (a) comprises the step of attaching said input mechanism to said programmable controller via a cord.

3. A method as defined in claim 1 additionally comprising the step of using said material application system to apply a liquid to said granular material before said granular material is applied to the road and while said input mechanism is operatively uncoupled from said programmable controller.

4. A method of using a material application system adapted to be incorporated in a vehicle for applying material as the vehicle is being driven, said material application system having a programmable controller, an input mechanism associated with said programmable controller, and a switch module associated with said programmable controller, said method comprising the steps of:

(a) operatively coupling said input mechanism to said programmable controller;

(b) while said input mechanism is operatively coupled to said programmable controller, using said input mechanism to program said programmable controller;

(c) after said step (b), operatively uncoupling said input mechanism from said programmable controller;

(d) while said input mechanism is operatively uncoupled from said programmable controller, using said material application system to apply said material;

(e) while said input mechanism is operatively uncoupled from said programmable controller, while said switch module is operatively coupled to said programmable controller, and while said material application system is being used to apply said material, using said switch module to modify a material application rate.

5. A method as defined in claim 4 wherein said material comprises a granular material and wherein said step (d) comprises the step of using said material application system to apply said granular material to a road.

6. A material application system adapted to be incorporated in a vehicle for applying material to a road, said material application system comprising:

a programmable controller;

an input mechanism operatively attachable to and removable from said programmable controller for inputting a plurality of material application parameters into said programmable controller, said material application parameters including a granular application rate, a liquid application rate, a granular configuration parameter, and a liquid configuration parameter;

a granular applicator for applying granular material to the road at said granular application rate input to said programmable controller via said input mechanism;

a granular actuator mechanism coupled to said granular applicator and said programmable controller for controlling said granular applicator;

a liquid applicator for applying liquid to said granular material at said liquid application rate input to said programmable controller via said input mechanism;

a liquid actuator mechanism coupled to said liquid applicator and said programmable controller for controlling said liquid applicator; and a switch module operatively coupled to said programmable controller, said switch module comprising:

a first switch for allowing an operator to change said granular application rate; and a second switch for allowing an operator to change said liquid application rate.

7. A system as defined in claim 6 wherein said input mechanism comprises a keyboard.

8. A system as defined in claim 6 wherein said granular applicator comprises a spinner.

9. A system as defined in claim 6 wherein said granular actuator mechanism comprises a valve actuator.

10. A system as defined in claim 6 wherein said liquid applicator comprises a valve.

11. A system as defined in claim 6 wherein said liquid actuator mechanism comprises a valve actuator.

12. A material application system adapted to be incorporated in a vehicle for applying material as the vehicle is being driven, said material application system comprising:

a programmable controller;

an input mechanism operatively attachable to and removable from said programmable controller for inputting a plurality of material application parameters into said programmable controller;

a material applicator for applying material at a material application rate as the vehicle is being driven;

an actuator mechanism coupled to said material applicator and said programmable controller for controlling said material applicator; and a switch module operatively attachable to said programmable controller, said switch module comprising a switch for allowing an operator to change said material application rate.

13. A system as defined in claim 12 wherein said input mechanism comprises a keyboard.

14. A system as defined in claim 12 wherein said actuator mechanism comprises a valve actuator.

15. A system as defined in claim 12 wherein said material applicator comprises a granular applicator, wherein said material actuator comprises a granular actuator, and wherein said switch of said switch module allows said operator to change a granular application rate.

16. A system as defined in claim 15 wherein said granular applicator comprises a spinner.

17. A system as defined in claim 15 additionally comprising:

a liquid applicator for applying liquid to said granular material at a liquid application rate;

a liquid actuator mechanism coupled to said liquid applicator and said programmable controller for controlling said liquid applicator; and a second switch disposed on said switch module for allowing an operator to change said liquid application rate.

18. A system as defined in claim 17 wherein said liquid actuator mechanism comprises a valve actuator.

* * * * *